US008326838B2

(12) United States Patent
Gaitas

(10) Patent No.: US 8,326,838 B2
(45) Date of Patent: Dec. 4, 2012

(54) EDUCATION CREDENTIALS MANAGEMENT METHOD AND SYSTEM

(76) Inventor: Angelo Gaitas, Ann Arbor, MI (US)

( * ) Notice: Subject to any disclaimer, the term of this patent is extended or adjusted under 35 U.S.C. 154(b) by 605 days.

(21) Appl. No.: 12/378,327

(22) Filed: Feb. 14, 2009

(65) Prior Publication Data

US 2010/0211601 A1 Aug. 19, 2010

(51) Int. Cl.
*G06F 17/00* (2006.01)

(52) U.S. Cl. ......... 707/741; 707/748; 707/769; 707/783

(58) Field of Classification Search ........................ None
See application file for complete search history.

(56) References Cited

U.S. PATENT DOCUMENTS

| | | | | |
|---|---|---|---|---|
| 7,877,354 | B2 * | 1/2011 | Dane et al. | 707/613 |
| 2002/0116634 | A1 * | 8/2002 | Okubo | 713/200 |
| 2003/0171927 | A1 * | 9/2003 | Bernard | 704/273 |
| 2005/0021350 | A1 * | 1/2005 | Scott et al. | 705/1 |
| 2006/0106629 | A1 * | 5/2006 | Cohen et al. | 705/1 |
| 2007/0124196 | A1 * | 5/2007 | Brief et al. | 705/11 |
| 2007/0203776 | A1 * | 8/2007 | Austin et al. | 705/8 |
| 2007/0203918 | A1 * | 8/2007 | Hartman et al. | 707/10 |
| 2007/0239575 | A1 * | 10/2007 | Claridge | 705/35 |
| 2008/0027993 | A1 * | 1/2008 | Andino et al. | 707/104.1 |
| 2009/0164282 | A1 * | 6/2009 | Goldberg | 705/7 |
| 2009/0228297 | A1 * | 9/2009 | McGovern et al. | 705/1 |
| 2009/0299829 | A1 * | 12/2009 | Fraser et al. | 705/11 |

* cited by examiner

*Primary Examiner* — Pierre Vital
*Assistant Examiner* — Mohammad S Rostami
(74) *Attorney, Agent, or Firm* — James M Smedley LLC; James Michael Smedley, Esq.

(57) ABSTRACT

A system and method for online storage and distribution of educational credentials and related documents of student and job seeker applicants comprising, a centralized education credentials document management database that receives and securely stores resumes, transcripts, letters of recommendation, military records, professional certificates, rental and credit history, and related documents from document sources such as university or school registrars, referees, and related entities to be easily accessible by document recipients such as undergraduate and graduate schools, recruiters, or employers. The system of the present invention provides a vast improvement over the existing time consuming and expensive methods of collecting, compiling and physically sending documents required for school admissions and job placement. By storing all of the original documents in a centralized online database student and job seeker applicants can easily comply with a wide array of document support requirements simply by providing a link to the parties that are requesting the information.

9 Claims, 3 Drawing Sheets

EDUCATION CREDENTIALS MANAGEMENT METHOD AND SYSTEM

FIELD OF THE INVENTION

This invention generally relates to an online data management system. More particularly, the invention relates to an online education credentials management system for students applying to undergraduate and graduate schools or seeking jobs after graduation as well as for other job seekers who appreciate the convenience of storing their educational credentials and related documents in a centralized database accessible by schools, recruiters, and employers.

BACKGROUND OF THE INVENTION

Historically, applying to schools whether undergraduate or graduate has involved the time consuming and often frustrating chore of physically compiling educational credentials such as transcripts, diplomas, and related documents as well as letters of reference and recommendations from teachers, mentors, employers, and others who may have had some influence in a student's life, and mailing the package to the institutions requesting the documents, in some cases at a substantial cost to the student applicant and or job seeker applicant. Before the advent of the internet and the convenience of electronic communications, this chore was doubly cumbersome, requiring phone calls or letters to the registrar for transcripts and to mentors and others with personal knowledge of the applicant requesting letters of reference and recommendations to be sent by mail to the applicant or directly to the institutions, with prolonged periods of waiting by the applicant or the institutions to physically receive the paper documents.

With the advent of the world wide web and the ability to rapidly disseminate and receive information, several online systems have emerged replacing some, but not all paper trails of yesteryears. Career and employment systems that primarily focus on matching job seekers to employers are well known in the art. U.S. Pat. No. 6,266,659 (Nadkarni) matches skills and resumes of candidates to employers and U.S. Pat. No. 6,385,620 (Kurzius & Johnston) employs a recruitment system matching candidates and employers. U.S. Pat. Appl. Pub. No. 2007/0294092 (Calannio) describes a system for marketing job applicants by creating and organizing credential as well as other personal information in the form of a customized advertisement to be shown to prospective hiring parties.

Online resume submission and storage as practiced by popular career and job websites such as Monster.com Careerbuilder.com, Hotjobs.com etc. are also well known in the art. U.S. Pat. No. 7,016,853 (Pereless & McCrae) describes a method and system for recruiters to collect jobseeker resumes from multiple "resume warehouses" such as the mentioned career and job sites by compiling the resumes from these sites into a service provider database to be accessed by the recruiter or employer for a fee. Intl. Appl. No. PCT/AU1999/000466 (Benheim) describes a method and system for selecting candidates for employment by storing candidate information in a database which subscribing agents and employers are able to access upon authorization by the candidate for a prescribed period of time for a fee. The candidate must reapply every three weeks to keep the curriculum vitae active. In these mentioned prior art, the storage of information in the server database is limited to resumes/curriculum vitae of the candidates for employment.

A few colleges and universities have made provisions for the access of transcripts online, but this is limited to their own graduates. U.S. Pat. No. 7,213,019 (Noris & Ortiz) provides group specific career management tools to group members such as students, faculty, department administrators, group officers, and alumni, or by entities trying to target group members.

Online storage and retrieval systems and methods thus far have addressed only the storage and retrieval of individual resumes and/or references for access by employers. U.S. Pat. No. 6,904,407 (Ritzel), uses an internet based electronic repository of only job seeker references. The system requires employers to pay a fee to purchase the details of the candidate's references. In, U.S. Pat. Appl. Pub. No. 2007/0282620 (Hatami), the recruitment server gathers and delivers the candidate letters of reference to the recruiters. If the referees chosen by the candidate refuse to give reference letters for the candidate, the candidate is not notified personally by the referees. Rather, the referees notify the recruitment server their desire not to give reference letters for the candidate; the server then notifies the candidate resulting in the candidate having to find other referees for the recruitment server and again go through the process of waiting to hear from the server whether a second or third referee has accepted or refused to provide the candidate a reference letter. This results in a time consuming and round-about way for the candidate job seeker to provide references to prospective employers. It is to be noted that in both Ritzel and Hatami the online storage of candidate information is limited to personal references with no communication means provided for access to any other information about the candidate job seeker by the employer or even by the candidate himself/herself such as academic transcripts from educational institutions, professional certificates, military records, rental and credit history etc., from other entities, and a means for storing such information securely online for easy access as envisioned by the present invention.

In general, none of the mentioned prior art have addressed or helped resolve the issue of the tedious work involved in compiling and disseminating the educational credentials and related documents by a student applicant to an undergraduate or graduate school for admission or to an employer by a job seeker. There is a significant pent-up demand for reliable and pertinent access to academic and career background data of students and job applicants. Accordingly, there is a need in the art for a centralized education credentials document storage and delivery database system easily accessible by the student applicant or job seeker as well as by the admitting institutions and employers to fill the vacuum left by the prior art. The present invention fulfills that need through its streamlined online educational credentials document management system.

The present invention is not merely a current enrollment or degree verification system as described in U.S. Pat. No. 7,263,491 (Geldermann & McKechney). Rather, the system and method employed in the present invention is based on the realities of job searches and graduate school applications. The highly affordable service of the system allows any student or job seeker to maintain all of their academic and career documents in one convenient location in a centralized database online. It places the power in the hands of the school or job applicant to decide which institutions and employers should have access to their records and the type of records that can be accessed through the centralized database by the institutions and employers.

The centralized educational credentials database system of the present invention uses a powerful online application processing method that will enable students, jobseekers, employers or graduate schools to quickly and easily access electronic copies of transcripts, letters of recommendation, candidate evaluation, resumes and related documents in an efficient and time saving manner to meet application deadlines. Armed with this service, students and job seekers will be able to quickly and efficiently apply to many different schools and/or job positions while colleges, universities, and employers will be able to quickly access all of the necessary information about an applicant from a single centralized location and quickly make an initial determination regarding the applicants prospects for admission to schools or a job. In addition, colleges and universities will experience the added benefit of having all of the transcripts, letters of recommendations, evaluations, and related documents for the past and present students available securely online, thus eliminating vast amounts of paperwork as well as the expense of hiring and paying personal to do the work of answering phone calls and emails and gathering and sending the requested documents physically by mail.

SUMMARY OF THE INVENTION

The present invention is an online document management solution for students and job seekers who would like the convenience of having all their educational credentials including, transcripts, awards, certificates, diplomas, and other support documents such as, resumes, letters of recommendations, evaluations, and military records in a centralized location to be accessed and distributed to institutions of higher learning or be available to recruiters and employers.

In an exemplary embodiment of the present invention, the documents and information are placed by an individual user at a client system and received by a server system. The server system receives information including identification of the user, personal information such as information pertaining to their resume and universities attended in order to request transcripts, diploma and other related documents from the respective institutions. The server system then assigns a client identifier to the client system and associates the assigned client identifier with the received information. The server system sends to the client system the assigned client identifier and an HTML document identifying the information/letter with an order button. The client system receives and stores the assigned client identifier and receives and displays the HTML document.

The present invention has taken the current expensive and frustrating resume and transcript delivery practices and turned it into a simple password driven website service. Since the system is totally web-based there is no software to download, install or learn to use. The simple user interface of the website enables users to perform online searches quickly and easily. Once the applicant signs up for the services of the present invention for a small fee, they only need to fill out a form after logging in and the information is automatically sent out to the recipients. When the recipients receive the requested documentation (s), they can simply check off an email-read receipt to confirm that the documents were received. The user of the website can maintain a profile indefinitely for the initial small fee.

The website of the present invention utilizes secure proprietary software to store personal information of the student applicant or job seeker. The website offers a unique way to store transcripts, diplomas, professional certificates, military records, recommendations, resumes, letters of reference, and other school or job related information in the system. For example, Federal job applications require KSA's (Knowledge, Skills, Abilities) which are unique requirements that a Federal hiring agency wants to find in a person selected to fill a particular job. The site also stores other background information about the student or job applicant that may be relevant to school admissions and job procurement such as rental history, credit history etc. This approach provides unsurpassed confidentiality and efficiency since the student applicants or job seekers are only required to submit a single document which is disseminated to the right parties in a reliable and responsible manner eliminating the need to physically mail these documents to the recipients. In addition, the student or job applicant will be able to avoid the time-consuming task of contacting schools and mentors repeatedly for transcripts, letters of recommendation, and other documents.

The key to the present invention is a sophisticated online data management system that uses a highly refined secure application to manage the two way movement of critical documents. When a student or job seeker applies to a school or a position, they only need to give a web address and password to the receiver whether a school's enrollment department or an employer who can then access all of the applicant's information online from the centralized database. Thus the system and method of the present invention has streamlined the process of accessing school and employment records.

The method and system of the present invention provides a vast improvement over existing methods where different documents are manually produced and physically forwarded over and over again to a potentially never-ending collection of interested parties. The system also provides end-users with a number of helpful options including the ability to review stored materials, adding or deleting documents, and entering personalized profile information that can be optionally read by potential employers and academic institutions.

These and other features and advantages of the present invention will be explained and will become obvious to one skilled in the art through the description of the drawings, detailed description of the invention, and the appended claims.

DETAILED DESCRIPTION OF THE INVENTION

The present invention can be more specifically described as a "Career Manager" that provides an "Online Education Credentials Document Management System" which manages career-related documents including transcripts, letters of recommendation, applicant evaluations, referral letters, reference lists, diplomas, certificates, awards, military records, rental, credit history etc. The present invention provides an improved method and system for accessing, storing, and disseminating educational credentials of students applying to institutions of higher learning and job seekers who would welcome the ease and convenience of having all of their academic and job related documents stored in a centralized database for access by the hiring entities in the academic institutions or by employers. The system provides a vast improvement over the existing methods used for applying to undergraduate and graduate institutions or jobs where a student or job seeker applicant has to spend countless number of hours on the phone communicating with registrars, personal referee's and other entities to request documents by mail, waiting for receipt of the documents, compiling the documents into individual packages to be mailed to several academic institutions, recruiters, or employers at a substantial expense to the student or job applicant.

The present invention achieves the goal of minimizing the time spent and the expense involved in gathering educational credentials and related documents from registrars, referees, and other entities by providing a centralized online document management database that uses sophisticated web-based communication tools to store all the required documents for easy access by the document recipients such as the institutions, recruiters, and employers.

With the help of the online database and sophisticated web-based communications tools, the invention makes sure that the applicants get the right documents into the right hands at the correct time. In short, by storing all of the original documents in a centralized online database, applicants can easily comply with a wide array of document support requirements simply by providing a link to the parties that are requesting the information. In addition, with the use of advanced system security and data access protocols applicants can restrict the flow of information any way they wish. They can even specify how long a document should be available and to which entities.

Figure 1:
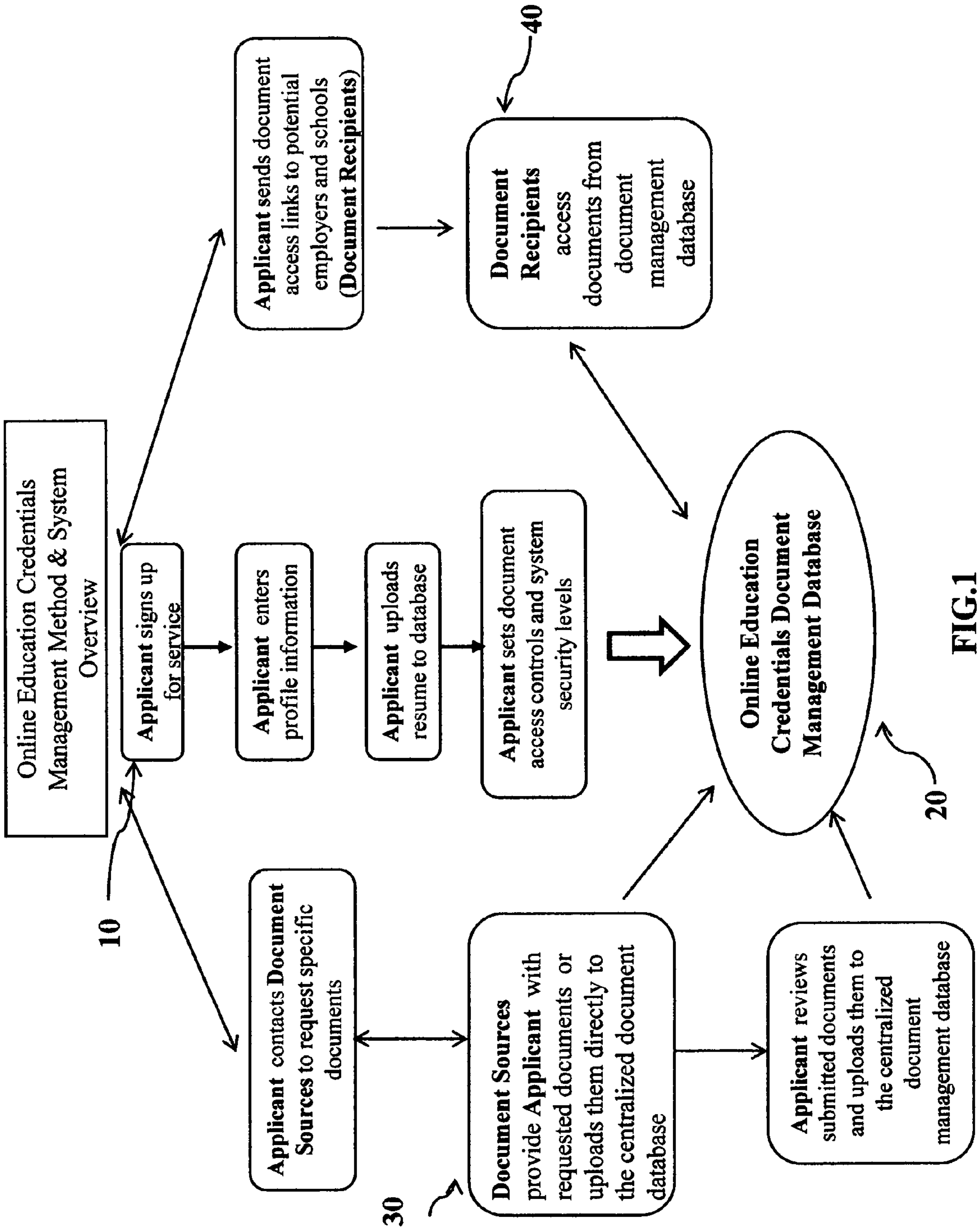
FIG. 1 shows a flow chart depicting the steps involved for the student or job seeker applicant to sign up for the services of the present invention.

In a preferred embodiment of the present invention as depicted in the flow chart in FIG. 1, the student or job seeker applicant ("Applicant") 10 signs up for the service provided by the Education Credentials Management System of the present invention. Applicant 10 fills out the required form to create a unique identifiable profile and uploads a resume to the online Education Credentials Documents Management Database, 20 for a small fee. The system further allows Applicant 10 to set document access controls and system security levels. In this embodiment, after the applicant 10 registers for the service, the applicant contacts the Document Sources 30 (individuals and organizations that provide documents) such as specific universities, referees, and other entities to request specific documents to be sent directly to the applicant or uploaded to the Education Credentials Document Management Database 20. In this embodiment, once all the required documents from the Document Sources 30 have been uploaded to the Education Credentials Document Management Database 20, Applicant 10 sends document access links to Document Recipients 40 (businesses and organizations that request documents) who may be schools to which the student applicant wishes to apply or in the case of a job seeker applicant to specific employers or recruiters. The Document Recipients 40 use the document access links provided by the Applicant 10 to retrieve the required documents from the Education Credentials Document Management Database 20.

In another embodiment of the present invention, the Applicant 10 exercises the option to request Document Sources 30 to send all documents directly to the applicant rather than the Education Credentials Document Management Database 20. In this embodiment, the Applicant 10 reviews the documents sent from the Document Sources 30 and makes a decision on which documents to be uploaded to the Education Credentials Document Management Database 20. In this embodiment, the Applicant 10 has control over for instance which referees letter of recommendation or applicant evaluation document should be uploaded to the Education Credentials Document Management Database 20.

In another embodiment of the present invention, the Applicant 10 has the option to decide which documents submitted directly to the Education Credentials Document Management Database 20 such as transcripts, letters of recommendation, applicant evaluation by referees, resumes etc., by the Document Sources 30 should be viewed by the Document Recipients 40 be they academic institutions, recruiters, or employers.

Figure 2:
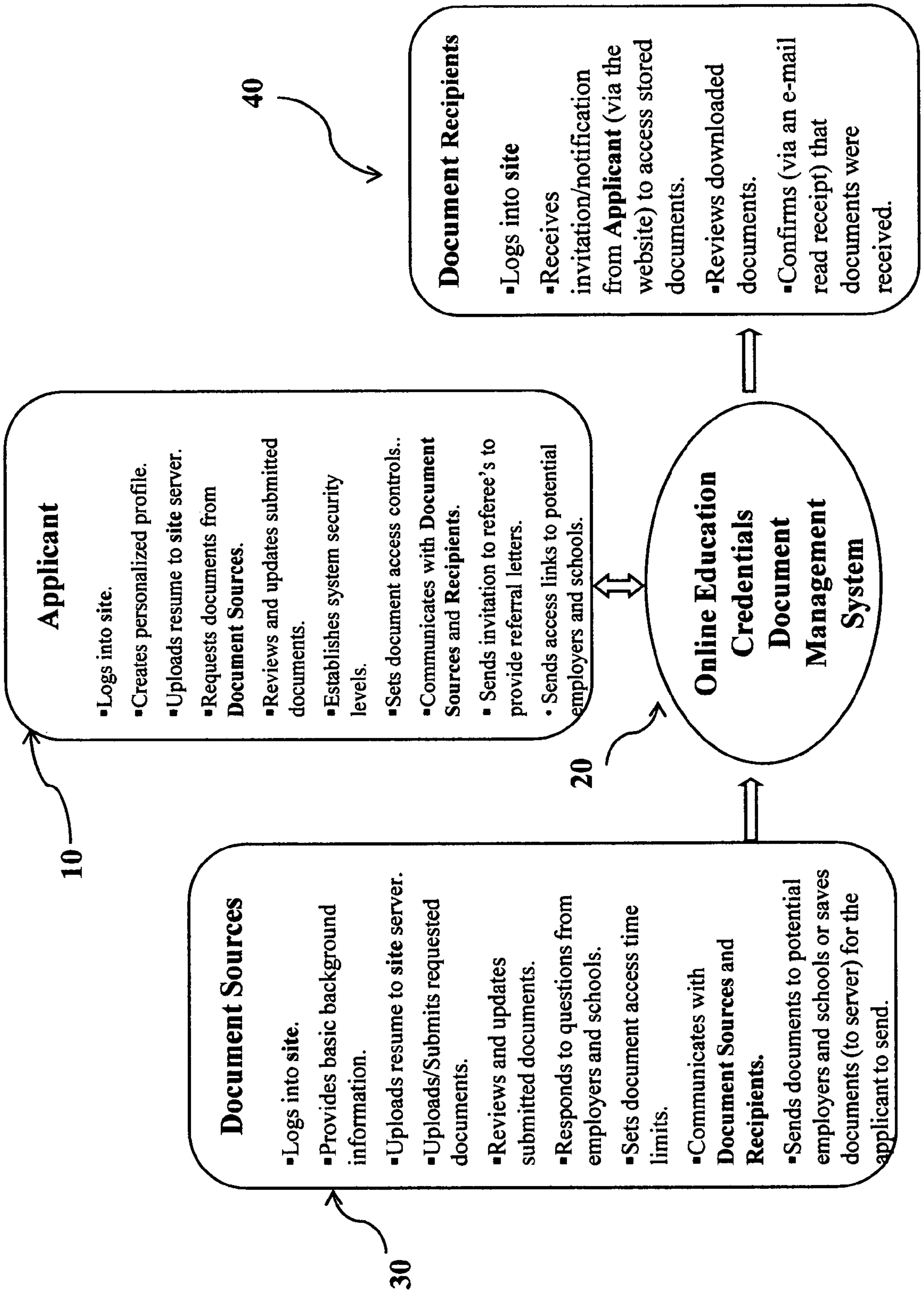
FIG. 2 shows a flow diagram with a more detailed embodiment of the invention.

FIG. 2 shows a flow diagram with a more detailed embodiment of the present invention. In this embodiment, the Applicant 10 logs into the website and after creating a uniquely identifiable profile, uploads a resume, sets up system security levels and document access controls, contacts Document Sources 30 and requests documents such as transcripts and diplomas from the registrars of universities attended and graduated, entities with information on the applicant's military records, professional certificates, rental and credit history etc., to be sent directly to Applicant 10 or the Education Credentials Document Management Database 20. In this embodiment, the referees receive invitations from Applicant 10 to log on and create their profiles before uploading or cutting and pasting letters of recommendation or applicant evaluation. The referees may send these documents directly to Applicant 10 or the Education Credentials Document Management Database 20 and respond to specific questions posed by the applicant. The site has a state of the art identity verification system for the referee through either a verifiable email address or IP address. In this embodiment, the referee maintains the option to provide the letter of recommendation to the requesting institution, recruiter, or employer without revealing its contents to the student or job seeker applicant. The referees further maintain the option to keep or not to keep the letter of recommendation or applicant evaluation of the student or job seeker applicant in the centralized database for future use by the student or job seeker applicant. In this embodiment, the Applicant 10 invites Document Recipients 40 whether academic institutions, recruiters, or employers to log in and create their own profiles to access the required documents from the Education Credentials Document Management Database 20. The Document Recipients 40 review the retrieved documents and confirm receipt through an email read receipt.

Figure 3:
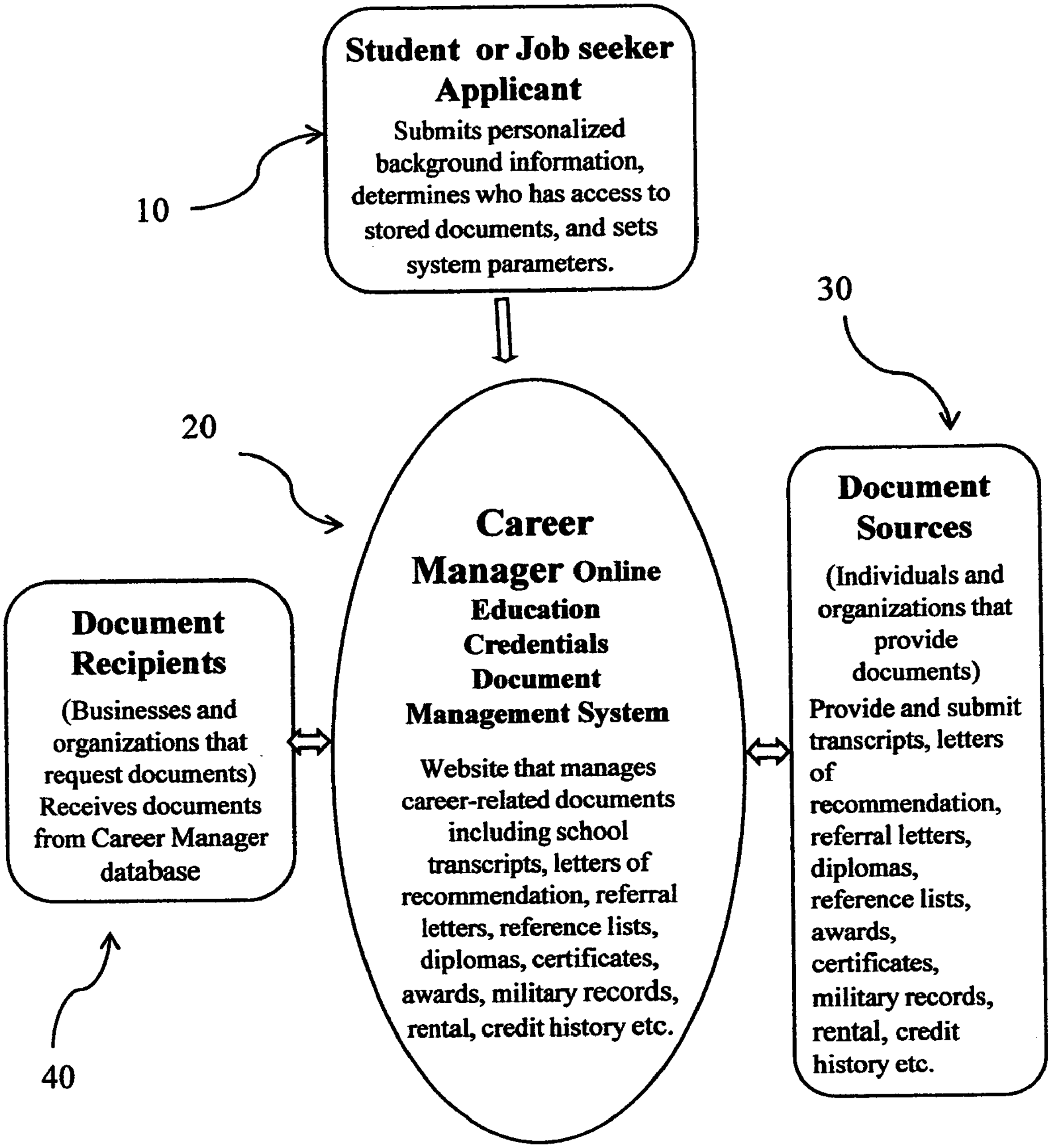
FIG. 3 shows a schematic diagram of the elements of the system and the architecture according to some embodiments of the present invention.

FIG. 3 shows a schematic diagram of the elements of the method, system and architecture to some embodiments of the present invention. The student or job seeker Applicant 10 submits personalized background information determines who has access to stored documents and sets system parameters. Document Sources 30, provide and submit transcripts, letters of recommendation, applicant evaluations, referral letters, diplomas, reference lists, awards, certificates, military records, rental, credit history etc. Document Recipients 40 receive documents from the Education Credentials Document Management Database 20. The referee maintains the option to provide the letter of recommendation for the Applicant 10 to the requesting institution, recruiter, or employer without revealing its contents to the student or job seeker applicant either directly or indirectly through the website. The system may send to the Document Recipients 40 the applicant's documentation package via email, conveniently aggregating all the information the Document Recipients 40 may require including but not limited to transcripts, letters of recommendation, applicant evaluations, referral letters, reference lists, diplomas, certificates, awards, military records, rental, credit history etc. Alternatively, the Document Recipients 40 may request access to the Education Credentials Document Management Database themselves and download or view online the information they require.

It is to be understood that the invention is not limited to the embodiments in the flow charts and flow diagrams or the corresponding descriptions.

While the invention has thus been described with respect to preferred embodiments; these embodiments should not be construed as limitations on the scope of the invention, but rather as exemplifications of some of the embodiments. Those skilled in the art will envision other possible variations, modifications, and applications that are also within the scope of the present invention. It is to be understood that alternatives, modifications, and variations of the present invention are to be construed as being within the scope and spirit of the appended claims.

What is claimed is:

1. A web-based system for managing and disseminating educational credentials and related data, said web-based system comprising:

a server comprised of hardware and software stored in non-volatile memory, wherein said server is connected to a network and said software is configured to provide a web portal to an applicant;

said server configured to receive identifiable information from said applicant;

said server configured to communicate with document sources and document recipients, wherein said document sources are selected from the group comprising one or more academic institutions and individual referees;

said server configured to receive a plurality of documents from said document sources;

said server configured to store said plurality of documents in a centralized database, wherein said centralized database is connected to a network and comprises non-volatile memory;

wherein said plurality of documents are selected from the group comprising academic transcripts, diplomas, military records, professional training certificates, awards, letters of recommendation, applicant evaluations and rental and credit histories;

said server configured to provide document recipients access to said plurality of documents from said centralized database only after said access is made available to said document recipients by said applicant, wherein said applicant selects a subset of said plurality of documents that will be made available to said document recipient wherein said subset comprises one or more of said plurality of documents but less than the complete set of the plurality of documents; and said server is further configured to provide a document source an automated email from said server and allow said document source to log in to the server via a link provided in the automated email to provide one or more of said plurality of documents, wherein the document source provides one or more of said plurality of documents to said server, wherein said document source maintains an option of revealing the content of said one or more of said plurality of documents to said applicant, wherein the applicant provides said subset of said plurality of documents to said document recipients without revealing the contents of the documents in said subset of said plurality of documents to said applicant, wherein the document source further maintains an option to retain or withdraw the one or more of said plurality of documents provided by the document source.

2. The system of claim I wherein, said applicant is a student or job seeker.

3. The system of claim 1, wherein said document recipients comprises one or more of an undergraduate school, a graduate school, a recruiter or an employer.

4. The system of claim 1, wherein said server storing said documents in a centralized database is a career management website.

5. A method of storing educational credentials and related data online, said method comprising:

providing access to an online education credentials document management database to an applicant;

receiving a plurality of documents, via said online education credentials document management database, from at least one document source, wherein said at least one document source is selected from the group comprising one or more academic institutions and individual referees and said one or more documents are selected from the group comprising academic transcripts, diplomas, military records, professional training certificates, awards, letters of recommendation, applicant evaluations and rental and credit histories;

providing access to a subset of said plurality of documents, via said online education credentials document management database, to a document recipient, only after said access is first approved by said applicant and said subset of said plurality of documents is selected by said applicant, wherein said subset of said plurality of documents comprises one or more of said plurality of documents but less than the complete set of the plurality of documents;

communicating said subset of said plurality documents, via said online education credentials document management database, to at least one document recipient;

communicating an automated email from said online education credentials document management database and logs in to said online education credentials document management database via a link provided in the automated email to provide said one or more of said plurality of documents, receiving said one or more of said plurality of documents from said at least one document source at said online education credentials document management database, wherein said applicant selects to provide said subset of said plurality of documents directly to the document recipient without revealing its contents to said applicant, and wherein said at least one document source is provided an option to withdraw said one or more of said plurality of documents from said education credentials document management database.

6. The method of claim 5 further comprising the step of receiving a request, from said applicant, for the applicant at least one document source to provide the one or more documents, wherein said one or more documents comprise one or more of a academic transcript, a diploma, a professional training certificate, a an award, a military record, a letter of recommendation, an applicant evaluation, a rental and credit history and related documents.

7. The method of claim 5, wherein said at least one document source enters the one or more documents related to said applicant into said education credentials document management database.

8. The method of claim 5, wherein said at least one document recipient accesses the one or more documents stored in said education credentials document management database.

9. A method of applying to schools and jobs, said method comprising:

logging into a website portal to create a personalized profile for an applicant by filling out a form and uploading a resume;

requesting a plurality of documents from one or more document sources, wherein said document sources are selected from the group comprising one or more academic institutions and individual referees and said plurality of documents are selected from the group comprising academic transcripts, diplomas, military records, professional training certificates, awards, letters of recommendation, applicant evaluations and rental and credit histories;

receiving said plurality of documents from said one or more document sources;

storing said plurality of documents in a centralized education credentials document management database;

providing access to a subset of said plurality documents stored in said centralized education credentials document management database to one or more potential schools or employers only after said access is provided by said applicant to said one or more potential schools or employers via one or more links, wherein said subset of said plurality of documents comprises one or more of said plurality of documents but less than the complete set of said plurality of documents;

transmitting to said applicant, from said centralized education credentials document management database, a confirmation email upon completion of provision of access to said subset of said plurality of documents to said one or more potential schools or employers; and said centralized education credentials document management database is further configured to provide a document source an automated email from said centralized education credentials document management database and allow said document source to log in to the centralized education credentials document management database via a link provided in the automated email to provide one or more of said plurality of documents, wherein the document source provides said one or more of said plurality of documents to said centralized education credentials document management database without revealing its contents to said applicant, wherein the applicant selects to provide said subset of said plurality of documents to document recipient without revealing its contents to said applicant, wherein the document source further maintains an option to withdraw said one or more of said plurality of documents from said centralized education credentials document management database.

* * * * *